United States Patent [19]

Kitaguchi et al.

[11] 3,957,917

[45] May 18, 1976

[54] RESIN COMPOSITION FOR SHAPING INFORMATION CARRIER

[75] Inventors: Hiroshi Kitaguchi, Kamakura; Katsuya Nakamura; Tsutomu Ueda, both of Tokyo; Tetsuyo Kawahara, Yokosuka; Mamoru Nakamura, Takaoka, all of Japan

[73] Assignee: Nippon Zeon Co., Ltd., Tokyo, Japan

[22] Filed: June 3, 1974

[21] Appl. No.: 475,747

[30] Foreign Application Priority Data
June 7, 1973 Japan.................. 48-63341

[52] U.S. Cl................... 260/884; 260/881; 260/885; 260/886; 260/898; 260/899; 260/901

[51] Int. Cl.² ............... C08L 25/14; C08L 27/06; C08L 31/02

[58] Field of Search ............ 260/884, 899, 885, 901

[56] References Cited
UNITED STATES PATENTS

| | | | |
|---|---|---|---|
| 3,019,208 | 1/1962 | Reid et al.......................... | 260/876 R |
| 3,189,664 | 6/1965 | Nozaki............................... | 260/884 |
| 3,334,156 | 8/1967 | Calentine et al.................... | 260/884 |
| 3,548,034 | 12/1970 | Cleemann et al,.................. | 260/884 |
| 3,632,679 | 1/1972 | DeWitt et al. ..................... | 260/884 |
| 3,663,657 | 5/1972 | Sturt................................. | 260/884 |
| 3,832,317 | 8/1974 | Mikofalvy et al.................... | 260/884 |

Primary Examiner—Murray Tillman
Assistant Examiner—Thurman K. Page
Attorney, Agent, or Firm—Sherman & Shalloway

[57] ABSTRACT

A composition for molding information carriers, such composition consisting of a uniformly kneaded mixture of (I) 100 parts by weight of a composite resin having a specific viscosity of 0.16 to 0.40 composed uniformly of (A) 90 to 40% by weight of a vinyl chloride resin portion having a specific viscosity of 0.16 to 0.28 and (B) 10 to 60% by weight of a methyl methacrylate portion having a specific viscosity of 0.10 tp 0.90, and (II) 1 to 10 parts by weight of molding additives, the specific viscosity being measured on a 100 ml. nitrobenzene solution containing 0.4g of the sample at 30°C., the composition having a melt viscosity of $3 \times 10^3$ to $3 \times 10^4$ poises at 160°C. at a shearing rate of $10^3$ sec$^{-1}$ and a break elongation of at least 10% when stretched at 25°C. at a tensile speed of 10mm/min.

8 Claims, No Drawings

RESIN COMPOSITION FOR SHAPING INFORMATION CARRIER

This invention relates to a resin composition for an information carrier, obtained by adding molding additives to a resin composition composed of a vinyl chloride resin portion and a methyl methacrylate resin portion.

It is an object of this invention to provide a resin composition for shaping an information carrier which has superior processability and abrasion resistance, and especially to provide a resin composition for use in disk phonograph records, film records or video disks which has superior workability in the production of information carriers, in which accurate signal sound grooves can be stamped, and which can faithfully reproduce the original signal many times.

For use as base resins for such a purpose, vinyl chloride polymers, vinyl chloride/vinyl acetate copolymers, and vinyl chloride/vinyl ether copolymers, for example, are known. However, disk records or film records prepared from these conventional base resins have the defect that the signal grooves are worn out by the stylus when reproducing the signal by a reproducting device, and furthermore, the distortion of the signal occurs or an abnormal signal is generated. The occurrence of such a phenomenon is especially remarkable when the number of reproductions increase, and in particular when the signal in the grooves has a high frequency.

In order to remove such defects, the degree of polymerization of the polymer used as the base or the copolymer compositions have been investigated extensively. When the abrasion resistance increases, the flowability of the resin at the time of melting becomes inferior. As a result, this will bring about a problem in the fidelity and reproducibility of the provision of sound grooves by a stamper. This is especially remarkable when the signal to be stamped has a high frequency. In recent years, there were developed multi-channel records in which two carrier waves, one in the low frequency range in the vicinity of 15 KHz, and the other in the high frequency range in the vicinity of 30 KHz, are grooved. For disk records of this type, the conventional resin compositions have inferior abrasion resistance, and when the signal is reproduced using a conventional stylus, it heavily injures the grooves. Therefore, a special phonograph stylus is needed.

We have made various investigations in order to remove the above defects and achieve the above object. This led to the discovery that a resin composition comprising (I) a composite resin composed uniformly of (A) 90 to 40% by weight of a vinyl chloride resin portion having a specific viscosity, as measured by JIS K6721 (concentration 0.4 g/100 ml = nitrobenzene solution, 30°C.), of 0.16 to 0.28 and (B) 10 to 60% by weight of a methyl methacrylate resin portion having a specific viscosity of 0.1 to 0.9 (concentration 0.4 g/100 ml = nitrobenzene solution, 30°C.), such composite resin having a specific viscosity of 0.16 to 0.40 (0.4 g/100 ml = nitrobenzene solution, 30°C.), and (II) molding additives, the resin composition having a melt viscosity of $3 \times 10^3$ $3 \times 10^4$ poises at a shearing rate of $10^3$ sec$^{-1}$ at 160°C. and a break elongation of at least 10% when stretched at a tensile speed of 10 mm/min. at 25°C., is useful for molding information carriers.

The base resin used in this invention is a composite resin in which the vinyl chloride resin portion (A) and the methyl methacrylate resin portion (B) are uniformly dispersed. The vinyl resin portion (A) is a vinyl chloride homopolymer or a vinyl chloride copolymer, the copolymer capable of containing not more than 40% by weight, preferably not more than 20% by weight, of a copolymerizable monomer such as vinyl acetate, vinylidene chloride, acrylonitrile, methylvinyl ether or an alkyl acrylate containing 4 to 10 carbon atoms. The methyl methacrylate resin portion (B) is a methyl methacrylate homopolymer or a methyl methacrylate copolymer, the copolymer being capable of containing not more than 30% by weight, preferably not more than 20% by weight, of a copolymerizable monomer such as styrene, acrylonitrile, or an alkyl acrylate or methacrylate containing 4 to 10 carbon atoms.

According to one embodiment of this invention, the composite resin (I) can be obtained by mixing 90 to 40% by weight, preferably 85 to 45% by weight, of the vinyl chloride resin having a specific viscosity of 0.16 to 0.28, preferably 0.18 to 0.28 and obtained by a customary suspension polymerization method, bulk polymerization method, emulsion polymerization method or solution polymerization method, and 10 to 60% by weight, preferably 15 to 55% by weight, of the methyl methacrylate resin having a specific viscosity of 0.10 to 0.90, preferably 0.12 to 0.50 and obtained by a customary suspension polymerization method, bulk polymerization method, emulsion polymerization method, or solution polymerization method by a customary powder blending method, a roll kneading method, a solution blending method or a method involving blending aqueous dispersions of polymers sufficiently uniformly.

According to another embodiment of this invention, the composite resin (I) is obtained by post-polymerizing in a customary manner 90 to 40% by weight, preferably 85 to 45% by weight, of a monomer which is to form the vinyl chloride resin portion, in emulsion, suspension or bulk using a radical initiator in the presence of 10 to 60% by weight, preferably 15 to 55% by weight of a methyl methacrylate resin having a specific viscosity of 0.1 to 0.9.

According to still another embodiment of this invention, the composite resin (I) is obtained by post-polymerizing in a customary manner a monomer which is to form the methyl methcrylate resin portion, in emulsion, suspension or bulk in the presence of a vinyl chloride resin having a specific viscosity of 0.16 to 0.28.

Composite resins prepared by the second technique described above in which the vinyl chloride resin portion is formed in the presence of a methyl methacrylate resin are desirable because of their moldability. When the resin components are mechanically mixed in accordance with the first embodiment described above, care should be taken to effect sufficient and uniform mixing so that the resulting resin composition gives satisfactory properties in regard to the scratch abrasion and the faithful provision of sound grooves which are required of disk records.

When the vinyl chloride resin portion of the resulting composite resin has a specific viscosity of less than the lower limit specified in the present invention (i.e., 0.16), a sheet molded from the resin composition breaks even by slight impact, and therefore, it is difficult to form it into a disk phonograph record. On the other hand, if the specific viscosity exceeds the upper limit (i.e., 0.28), disk records produced by providing sound grooves by a stamper suffer from warping and moreover, the sound grooves are not faithfully provided.

On the other hand, when the specific viscosity of the methyl methacrylate resin portion is less than the lower limit (0.10), the composite resin has inferior scratch abrasion as will be described below, and causes a poor fabrication of sound grooves. On the other hand, if the specific viscosity exceeds the upper limit (0.9), the melt viscosity of the resin composition increases. Consequently, the warping of the disk records and the poor fabrication of sound grooves become remarkable.

Now, turning to the ratio between the vinyl chloride resin portion and the methyl methacrylate resin portion, when the proportion of the vinyl chloride resin portion exceeds 90% by weight, and the methyl methacrylate resin portion is less than 10% by weight, the resulting composite resin has poor scratch abrasion. If the proportion of the vinyl chloride resin portion is less than 40% by weight, and the proportion of the methyl methacrylate resin portion exceeds 60% by weight, the melt viscosity of the composition rises, and the break elongation is insufficient. Consequently, the warping of the disk record, the poor fabrication of sound grooves and the breakage of records occur.

It is essential in the present invention that not only the specific viscosity of the vinyl chloride resin portion (A) is 0.16 to 0.28, and the specific viscosity of the methyl methacrylate resin portion (B) is 0.10 to 0.90, but also the composite resin (I) composed of the vinyl chloride resin portion and the methyl methacrylate resin portion has a specific viscosity of 0.16 to 0.40, preferably 0.16 to 0.30. Resin compositions obtained from composite resins having a specific viscosity outside this range cannot be satisfactorily fabricated into information carriers in a sheet or film form, and thus, the desirable information carriers contemplating by the present invention cannot be obtained.

The resin composition for molding information carriers is prepared by mixing 1 to 10 parts by weight of the molding additives (II) usually used for the manufacture of phonograph records with 100 parts of the composite resin (I). If the proportion of the additives is outside this range, it is difficult to obtain preferred information carriers, and therefore, such a proportion should be avoided. Examples of the additives are a heat stabilizer for vinyl chloride resins (0.5 to 8 parts by weight) such as metal soaps, organic tin compounds, epoxy compounds and phosphorous acid compounds, a lubricant (0 to 1 parts by weight) such as a higher fatty acid, fatty acid amide, higher alcohol or fatty acid ester, and an antistatic agent (0 to 1 part by weight) such as an organic amine, fatty acid amide, quaternary ammonium salt, phosphoric acid ester or polyhydric alcohol, or a pigment such as carbon black.

It is preferred to knead the composite resin (I) and the molding additives (II) so as to form a uniform mixture. When the composite resin (I) is a blend of the vinyl chloride resin and the methyl methacrylate resin, thorough kneading is required.

The resin composition so obtained should have the following properties, and resin compositions not having these properties are unsatisfactory for the purpose of the present invention.

Specifically, the resin composition of this invention should have a melt viscosity of $3 \times 10^3$ to $3 \times 10^4$ when it is measured at a shearing rate of $10^3$ sec$^{-1}$ at 160°C., and a break elongation of at least 10% when stretched at 25°C. at a tensile speed of 10 mm/min. When the melt viscosity under these conditions exceeds $3 \times 10^4$ poises, the recorded disk is warped, and poor fabrication of sound grooves occurs. On the other hand, when the melt viscosity is less than $3 \times 10^3$, the press-formed sheet is very brittle and cannot be used for manufacturing disk phonographic records. Furthermore, when the break elongation of the resin composition is less than 10%, the fabricated sheet or disk record breaks under slight impact in addition to the warping of the disk and the poor fabrication of sound grooves. Accordingly, resin compositions having a melt viscosity and a break elongation outside the ranges specified above are not desired in the present invention.

The resin composition of this invention is prepared by adding required amounts of additives such as commercially available stabilizers, antistatic agents, lubricants or pigments, and sufficiently mixing them at room temperature or at an elevated temperature using a customary ribbon blender, Banbury's mixer, or high speed stirrer.

The most common method for fabricating disk phonograph records now in use comprises kneading the resulting mixture further by an extruder and extruding a suitable amount of the kneaded mixture, and then fabricating it under pressure by means of a stamper thereby to provide sound grooves. If desired, a step of forming pellets by roll kneading or extrusion kneading is employed after a step of incorporating the various additives. Especially when the composite resin (I) is a mechanical blend of the vinyl chloride resin and the methyl methacrylate resin, it is desirable to use this step of pelletization.

The resin composition of this invention has superior moldability and abrasion resistance and give excellent disk records in auditory evaluation after repeatedly playing the record on a gramophone many times, and is suitable as a composition for molding information carriers such as phonograph disk records. This will be more specifically illustrated by the following Examples.

In the following Examples, the samples were prepared by the following method, and the various properties were evaluated by the following methods. [Method for preparation of the samles]

Compounding recipe

| | | |
|---|---|---|
| Composite resin | 100 | parts by weight |
| Stabilizer of the polymerized organotin mercaptide type (ADVASTAB T-17MJ; made by K.K. Toa Rika Kogyo) | 1 | " |
| Epoxy-type stabilizer (MARK EP-4100 made by Asahi Denka Kogyo K.K.) | 2 | " |
| Antistatic agent of the organic quaternary ammonium salt type (ELEGAN R115 made by Nippon Oils and Fats Co., Ltd.) | 0.5 | " |
| Carbon black (MITSUBISHI CARBON No. 600 made by Mitsubishi Chemical Industries, Ltd.) | 0.1 | " |

The above ingredients were mixed by a blender, and then the molten mixture was extruded at a predetermined rate through a 40 mm$\phi$ extruder (compression ratio 2.5 L/D = 22, speed of rotation 30 rpm) while maintaining the temperature of the lower part of the hopper and that of the die portion at 140°C. and 160°C. respectively. The molten extrudate was compression molded for 20 seconds at 160°C. using a 75-ton press or stamper, cooled for 15 seconds, and then withdrawn. The molded article was used for evaluation of the various properties. (Procedure A)

When the composite resin (I) is a mechanical blend of the components (A) and (B), the following procedure is used unless otherwise specified. The various ingredients in the above recipe were mixed, and the mixture was pelletized by a 65 mm$\phi$ extruder (compression ratio 3.0, L/D = 20, the speed of rotation 30 rpm) while maintaining the temperature of the lower portion of the hopper and that of the die portion at 140°C. and 160°C. respectively. Then the pellets obtained were extruded at a predetermined rate through a 40 mm$\phi$ extruder (compression ratio 2.5, L/D = 22, speed of rotation 30 rpm) while maintaining the temperature of the lower part of the hopper and that of the die portion at 140°C. and 160°C. respectively. The molten extrudate was compression molded for 20 seconds at 160°C. using a 75-ton press or stamper, cooled for 15 seconds, and then withdrawn. The molded article was used for evaluation of the various properties.
(Procedure B)
Melt viscosity The pressed sample was cut into fragments, and the melt viscosity was measured at a temperature of 160°C. and at a shearing rate of $10^3$ sec$^{-1}$, using a Koka-type flowtester with a nozzle size of 10 mm × 1 mm$\phi$.
[Break elongation]

The break elongation of the above press-formed sample was measured in accordance with JIS K 6745 at a tensile speed of 10 mm/min. and a temperature of 25°C.
[Depth of scratched injury]

Using a diamond stylus having a tip angle of 120° under a load of 2 Kg, the same portion of the pressed sample was repeatedly scratched five times at a scratch speed of 30 cm/min. at 25°C., and the depth of the scratched injury was measured using a SALEBRO Meter (Model AB-2, made by Mitsutoyo Seisakusho).
[Warping and poor fabrication]

The disk record in which sound grooves had been provided by a stamper as above was placed flat, and the presence of warping of the disk was observed by the naked eye. Furthermore, twenty records were observed by the naked eye to determine whether the sound grooves were faithfully provided, and the number of poor products was counted.
[Auditory evaluation]

Using a pickup for auditory evaluation, the auditory evaluation of a reproduced sound of a record having a certain signal sound stamped therein was first performed. Then, using a pickup for abrasion, the record was worn fifty times repeatedly. Then, the auditory evaluation of the reproduced sound was performed again using the pickup for evaluation. The results of evaluation were rated on the following scale.

o : Felt no noise, or slight noise
Δ : Felt comparatively few noise
x : Felt much noise Both of the pickups were provided with a diamond stylus having a tip radius of 0.018 ± 0.002 mm. The stylus pressure in the pickup for evaluation was 2 gr, and that in the pickup for abrasion was 10 gr.

EXAMPLE 1

In order to determine influences to be caused by changes in the ratio between the vinyl chloride resin portion and the methyl methacrylate resin portion, post-polymerization was performed under conditions such that the vinyl chloride resin portion to be obtained by the post-polymerization would have a constant specific viscosity while maintaining the specific viscosity of the methyl methacrylate resin portion constant.

A polymerization reactor was charged with the following recipe excepting dilauroyl peroxide. The charge was stirred for 1 hour at room temperature to dissolve the methyl methacrylate polymer in the vinyl chloride monomer. Then, dilauroyl peroxide was added, and the temperature was elevated to 62°C. to perform the polymerization. The polymerization operation was stopped after the pressure of the polymerization reactor decreased to 1.0 Kg/cm$^2$. Then, a white granular polymer was separated and recovered. A sample was prepared from this polymer by the procedure A, and the following tests were performed. The results are shown in Table 1.

Recipe

| | |
|---|---|
| Water | 200 parts by weight |
| Partially saponified polyvinyl acetate | 0.2 part by weight |
| Cellulose derivative | 0.2 part by weight |
| Dilauroyl peroxide (LPO) | varying amount |
| Trichloroethylene (TCE) | varying amount |
| Methyl methacrylate polymer (PMMA)[*1] | varying amount |
| Vinyl chloride (VCL)[*2] | varying amount |

[*1] A bead-like polymer obtained by suspension polymerization having a specific viscosity of 0.16 (0.4 g/100 ml=nitrobenzene solution 30°C.)
[*2] Containing 8.5% by weight of vinyl acetate.

Table 1

| | Present invention | | | | | Comparison | | | |
|---|---|---|---|---|---|---|---|---|---|
| Experiments | 1 | 2 | 3* | 4 | 5 | 6 | 7 | 8 | 9** |
| Amounts charged (Parts by weight) | | | | | | | | | |
| PMMA (specific viscosity 0.16 | 15 | 30 | 30 | 55 | 0 | 5 | 80 | 100 | 30 |
| VCl | 85 | 70 | 70 | 45 | 100 | 95 | 20 | 0 | 70 |
| TCE | 1.45 | 1.20 | 1.50 | 0.77 | 1.72 | 1.63 | 0.34 | — | — |
| LPO | 0.21 | 0.17 | 0.17 | 0.11 | 0.24 | 0.23 | 0.05 | — | — |
| Specific viscosity of the composite resin (0.4g/10 ml = nitrobenzene solution) | 0.21 | 0.20 | 00.20 | 0.18 | 0.22 | 0.21 | 0.17 | 0.16 | 0.20 |
| Melt viscosity (poises) | 7.3×10$^3$ | 8.1×10$^3$ | 1.0+10$^4$ | 1.0×10$^4$ | 6.5×10$^3$ | 6.8+10$^3$ | 3.2×10$^4$ | 3.5×10$^4$ | 8.0×10$^3$ |
| Break elongation (%) | 70 | 35 | 30 | 15 | 150 | 120 | 5 | 5 | 50 |
| Scratch abrasion ($\mu$) | 28 | 22 | 23 | 20 | 40 | 35 | 18 | 15 | 50 |
| Warping of the disk | None | None | None | None | None | None | Yes | Yes | None |
| Poor fabrication of sound grooves (number) | 0 | 0 | 0 | 0 | 0 | 0 | 20 | 20 | 16 |
| Auditory evaluation | | | | | | | | | |
| Initial | o | o | o | o | o | o | x | x | x |

Table 1-continued

| Experiments | Present invention | | | | | Comparison | | | |
|---|---|---|---|---|---|---|---|---|---|
| | 1 | 2 | 3* | 4 | 5 | 6 | 7 | 8 | 9** |
| After abrasion | | Δ | o | o | o | x | x | — | — | — |

*In Experiment 3, vinyl chloride to be post-polymerized did not contain vinyl acetate.
**In Experiment 9, a blend of the vinyl chloride polymer (specific viscosity 0.22) obtained in Experiment 5 and PMMA (specific viscosity 0.16) obtained by procedure A was used.

Referring to Table 1, the specific viscosity of the vinyl chloride polymer obtained in Experiment 5 was 0.22. As can be seen from Table 1, the resin compositions having a larger proportion of the vinyl chloride resin portion than in the present invention (Experiments 5 and 6) have poor scratch abrasion, and those having a larger proportion of the methyl methacrylate resin portion (Experiments 7 and 8) are susceptible to the warping of the disk and the poor fabrication of sound grooves. None of these comparative resin compositions are desirable for manufacturing phonographic disk records.

The resin composition prepared by mere insufficient mechanical mixing (procedure A) of the vinyl chloride resin portion and the methyl methacrylate resin portion without relying on the post-polymerization (Experiment 9) has poor scratch abrasion and the poor fabrication of sound grooves. Furthermore, in Experiments 7 and 8 (comparisons) in which the resin composition has low break elongation, breakage occurs at the peripheral portion of the disk by slight impact, and thus, care must be taken in handling it.

The records manufactured from the compositions of this invention exhibited superior results in the auditory evaluation.

EXAMPLE 2

Experiment 2 of Example 1 was repeated except that 70 parts by weight of vinyl chloride (containing 8.5% of vinyl acetate) and 30 parts by weight of a methyl methacrylate resin (PMMA) were used, and the viscosity of the composite resin was varied by varying the specific viscosity of the methyl methacrylate resin and the post-polymerization conditions as shown in Table 2. The results are shown in Table 2.

As can be seen from Table 2, when the specific viscosity of the methyl methacrylate resin portion and that of the composite resin are outside the range specified in the present invention (Experiments 5, 7 and 8), the resulting resin compositions exhibit properties undesirable for manufacture of disk phonograph records.

In the case of Experiment 5, the melt viscosity could not be measured under the same conditions as in the other Experiment, and the press-formed sheet was very brittle and was unsuitable for production of disk records.

In the auditory evaluation, too, good results were obtained with the resin compositions of the present invention.

Table 2

| Experiments | Present invention | | | | | Comparison | | |
|---|---|---|---|---|---|---|---|---|
| | 1 | 2 | 3 | 4 | 5 | 6 | 7 | 8 |
| Polymerization conditions | | | | | | | | |
| PMMA Specific viscosity of PMMA | 0.16 | 0.16 | 0.12 | 0.26*[1] | 0.16 | 0.16 | 0.10 | 1.16 |
| Specific Viscosity of PVC*[2] | 0.18 | 0.28 | 0.19 | 0.23 | 0.15 | 0.30 | 0.22 | 0.22 |
| Temperature (°C.) | 58 | 58 | 62 | 62 | 58 | 58 | 62 | 62 |
| TCE (part) | 1.26 | 0.21 | 1.20 | 1.20 | 1.68 | 0 | 1.20 | 1.20 |
| Specific viscosity of the composite resin | 0.17 | 0.24 | 0.19 | 0.23 | 0.15 | 0.25 | 0.18 | 0.50 |
| Melt viscosity (poises) | $6.5 \times 10^3$ | $2.0 \times 10^4$ | $7.1 \times 10^3$ | $1.2 \times 10^4$ | $(3.2 \times 10^3 >>)$ Unmeasurable | $3.2 \times 10^4$ | $5.3 \times 10^3$ | $3.5 \times 10^4$ |
| Break elongation (%) | 15 | 40 | 35 | 35 | — | 40 | 15 | 20 |
| Scratch abrasion (μ) | 23 | 21 | 25 | 21 | — | 27 | 35 | 20 |
| Warping of the disk | None | None | None | None | — | Yes | None | Yes |
| Poor fabrication of sound grooves (number) | 0 | 0 | 0 | 0 | — | 10 | 2 | 16 |
| Auditory evaluation | | | | | | | | |
| Initial | o | o | o | o | — | x | Δ | x |
| After abrasion | o | o | o | o | — | — | x | — |

*[1]A methyl methacrylate copolymer containing 10% of ethyl acrylate and 5% of acrylonitrile was used as the methyl methacrylate resin portion.
*[2]The specific viscosity of PVC when vinyl chloride containing 8.5% of vinyl acetate was polymerized under the same conditions in the absence of a methyl methacrylate resin.

EXAMPLE 3

Methyl methacrylate was subjected to an aqueous suspension polymerization in the presence of a vinyl chloride resin having a specific viscosity of 0.22 and containing 8.5% (charged) of vinyl acetate as polymerized in Experiment 5 of Example 1. The polymerization time was 10 hours at 50°C. at the initial stage of polymerization, and then 5 hours at 65°C. The same evaluation as in Example 1 was performed. It was found that the resin composition obtained had a melt viscosity of $8.3 \times 10^3$ poises, a break elongation of 20%, and a scratch abrasion of 28μ. There was one sample with poor fabrication of sound grooves out of ten samples. The auditory evaluation was good.

A methyl methacrylate resin obtained by polymerizing methyl methacrylate under the same conditions in the absence of a vinyl chloride resin had a specific viscosity of 0.35. The specific viscosity of the composite resin was 0.25.

Recipe

| | | |
|---|---|---|
| Water | 200 | parts by weight |
| Tertiary dodecyl mercaptan | 0.6 | " |
| Vinyl chloride resin | 70 | " |
| Methyl methacrylate | 30 | " |

| Recipe-continued | | |
|---|---|---|
| Dilauroyl peroxide | 1.0 | " |

EXAMPLE 4

Samples were prepared by procedure B using 70 parts by weight of a vinyl chloride resin (containing 8.5% of vinyl acetate) and 30 parts by weight of a methyl methacrylate resin, and varying the specific viscosities of these resins. The properties of the samples were evaluated in the same way as in Example 1. The results are shown in Table 3.

As can be seen from Table 3, when the specific viscosities of the vinyl chloride resin, methyl methacrylate resin and the composite resin are outside the ranges specified in the present invention (comparisons), the properties of the resin compositions are unsatisfactory for fabrication of disk phonograph records.

Especially, in the case of Experiment 5, the melt viscosity could not be measured under the same conditions as in the other runs, and the press-formed sheet was very brittle and was quite unsuitable for manufature of disk records.

2. The composition for molding information carriers according to claim 1 wherein said vinyl chloride resin (A) is a vinyl chloride homopolymer or a vinyl chloride copolymer containing up to 40% by weight of a copolymerizable monomer selected from vinyl acetate, vinylidene chloride, acrylonitrile, methyl vinyl ether and an alkyl acrylate containing from 4 to 10 carbon atoms and the methylmethacrylate resin (B) is a methylmethacrylate homopolymer of a methylmethacrylate copolymer wherein the copolymer contains not more than 30% by weight of a copolymerizable monomer selected from styrene, acrylonitrile or an alkyl acrylate and alkyl methacrylate containing from 4 to 10 carbon atoms.

3. The composition for molding information carriers according to claim 1 wherein said molding additives are selected from the group consisting of (a) 0.5 to 8 parts by weight of a heat stabilizer for said vinyl chloride resin (B), (b) 0 to 1 part by weight of a lubricant, (c) 0 to 1 part by weight of an antistatic agent, and (d) pigments.

4. In an information carrier such as disk phonograph record, film record or video disk containing sound signal grooves containing information for reproduction by a signal reproducing device of the type containing a Table 3

| | Present invention | | | | | Comparison | | |
|---|---|---|---|---|---|---|---|---|
| Experiments | 1 | 2 | 3 | 4 | 5 | 6 | 7 | 8 |
| Specific viscosity of vinyl chloride resin | 0.18 | 0.28 | 0.22 | 0.22 | 0.15 | 0.30 | 0.22 | 0.22 |
| Specific viscosity of methyl methacrylate resin | 0.16 | 0.16 | 0.12 | 0.26* | 0.16 | 0.16 | 0.09 | 1.16 |
| Specific viscosity of the composite resin | 0.17 | 0.24 | 0.19 | 0.23 | 0.15 | 0.26 | 0.18 | 0.50 |
| Melt viscosity (poises) | $6.2 \times 10^3$ | $2.2 \times 10^4$ | $8.0 \times 10^3$ | $8.3 \times 10^3$ | ($3 \times 10^3 >>$) Unmeasurable | $3.2 \times 10^4$ | $5.5 \times^3$ | $1.5 \times 10^4$ |
| Break elongation (%) | 15 | 40 | 30 | 20 | — | 40 | 15 | 5 |
| Scratch abrasion ($\mu$) | 22 | 22 | 23 | 23 | — | 27 | 35 | 30 |
| Warping of the disk | None | None | None | None | — | Yes | None | Yes |
| Poor fabrication of sound grooves (number) | 0 | 0 | 0 | 1 | — | 10 | 2 | 20 |
| Auditory evaluation | | | | | | | | |
| Initial | o | o | o | o | — | x | Δ | x |
| After abrasion | o | o | o | Δ | — | — | x | — |

*The methyl methacrylate resin used was a methyl methacrylate polymer containing 10% of ethyl acrylate and 5% of acrylonitrile.

What we claim is:

1. A composition for molding information carriers, said composition consisting of a uniformly kneaded mixture of (I) 100 parts by weight of a composite resin having a specific viscosity of 0.16 to 0.40 composed uniformly of (A) 90 to 40% by weight of a vinyl chloride resin having a specific viscosity of 0.16 to 0.28 and (B) 10 to 60% by weight of a methyl methacrylate resin having a specific viscosity of 0.10 to 0.90, said composite resin (I) obtained by post-polymerizing 90 to 40 parts by weight of a monomer which is to form the vinyl chloride resin portion, in the presence of 10 to 60 parts by weight of a methyl methacrylate resin having a specific viscosity of 0.10 to 0.90 using a radical initiator, and (II) 1 to 10 parts by weight of at least one molding additive conventionally used in the manufacture of information carriers, the specific viscosities being measured on a 100 ml. nitrobenzene solution containing 0.4 g of the sample at 30°C., said composition having a melt viscosity of $3 \times 10^3$ to $3 \times 10^4$ poises at 160°C. at a shearing rate of $10^3$ sec$^{-1}$ and a break elongation of at least 10% when stretched at 25°C. at a tensile speed of 10 mm/min.

stylus for traveling in the sound signal grooves wherein the information carrier is formed from a resin composition, the improvement comprising using as said resin composition a uniformly kneaded mixture of (I) 100 parts by weight of a composite resin having a specific viscosity of 0.16 to 0.40 composed uniformly of (A) 90 to 40% by weight of a vinyl chloride resin having a specific viscosity of 0.16 to 0.28 and (B) 10 to 60% by weight of a methyl methacrylate resin having a specific viscosity of 0.10 to 0.90, wherein said composite resin (I) is obtained by post-polymerizing 90 parts by weight of a monomer which is to form the vinyl chloride resin portion, in the presence of 10 to 60 parts by weight of a methyl methacrylate resin having a specific viscosity of 0.10 to 0.90 using a radical initiator, and (II) 1 to 10 parts by weight of at least one molding additive conventionally used in the manufacture of information carriers, the specific viscosities being measured on a 100 ml. nitrobenzene solution containing 0.4 g of the sample at 30°C., said composition having a melt viscosity of $3 \times 10^3$ to $3 \times 10^4$ poises at 160°C. at a shearing rate of $10^3$ sec$^{-1}$ and a break elongation of at least 10% when stretched at 25°C. at a tensile speed of 10 mm/min.

5. The improved information carrier of claim 4 wherein said molding additives are selected from the group consisting of (a) 0.5 to 8 parts by weight of a heat stabilizer for said vinyl chloride resin (B), (b) 0 to 1 parts by weight of a lubricant, (c) 0 to 1 parts by weight of an antistatic agent, and (d) pigments.

6. A process for preparing a resin composition for use in molding information carriers comprising uniformly kneading a mixture of (I) 100 parts by weight of a composite resin having a specific viscosity of 0.16 to 0.40 composed uniformly of (A) 90 to 40% by weight of a vinyl chloride resin having a specific viscosity of 0.16 to 0.28 and (B) 10 to 60% by weight of a methyl methcrylate resin having a specific viscosity of 0.10 to 0.90, wherein said composite resin (I) is obtained by post-polymerizing 90 to 40 parts by weight of a monomer which is to form the vinyl chloride resin, in the presence of 10 to 60 parts by weight of a methyl methacrylate resin having a specific viscosity of 0.10 to 0.90 using a radical initiator, and (II) 1 to 10 parts by weight of at least one molding additive conventionally used in the manufacture of information carriers, the specific viscosities being measured on a 100 ml. nitrobenzene solution containing 0.4 g. of the sample at 30°C., said composition having a melt viscosity of $3 \times 10^3$ to $3 \times 10^4$ poises at 160°C. at a shearing rate of $10^3$ sec$^{-1}$ and a break elongation of at least 10% when stretched at 25°C. at a tensile speed of 10 mm/min.

7. The process for preparing a resin composition for use in molding information carriers according to claim 6 wherein said molding additives are selected from (a) 0.5 to 8 parts by weight of a heat stabilizer for said vinyl chloride resin (B), (b) 0 to 1 part by weight of a lubricant, (c) 0 to 1 part by weight of an antistatic agent, and (d) pigments.

8. The improved information carrier of claim 4 wherein said vinyl chloride resin (A) is a vinyl chloride homopolymer or a vinyl chloride copolymer containing up to 40% by weight of a copolymerizable monomer selected from vinyl acetate, vinylidene chloride, acrylonitrile, methyl vinyl ether and an alkyl acrylate containing from 4 to 10 carbon atoms and the methylmethacrylate resin (B) is a methylmethacrylate homopolymer or a methylmethacrylate copolymer wherein the copolymer contains not more than 30% by weight of a copolymerizable monomer selected from styrene, acrylonitrile or an alkyl acrylate and alkyl methacrylate containing from 4 to 10 carbon atoms.

* * * * *

UNITED STATES PATENT AND TRADEMARK OFFICE
CERTIFICATE OF CORRECTION

PATENT NO. : 3,957,917
DATED : May 18, 1976
INVENTOR(S) : Hiroshi Kitaguchi, et al It is certified that error appears in the above-identified patent and that said Letters Patent are hereby corrected as shown below:

Claim 5, line 5, delete "parts" in both instances, insert -- part -- in both instances.

Claim 6, line 8, delete "methcrylate", insert -- methacrylate --

Signed and Sealed this

Seventh Day of September 1976

[SEAL]

Attest:

RUTH C. MASON
*Attesting Officer*

C. MARSHALL DANN
*Commissioner of Patents and Trademarks*